United States Patent [19]

Latto

[11] Patent Number: 4,712,120
[45] Date of Patent: Dec. 8, 1987

[54] LASER MATERIALS TREATMENT SYSTEM

[75] Inventor: William Latto, Kissimee, Fla.

[73] Assignee: C-E Industrial Lasers, Incorporated, Somerville, Mass.

[21] Appl. No.: 840,500

[22] Filed: Mar. 17, 1986

[51] Int. Cl.⁴ .............................................. G01D 15/00
[52] U.S. Cl. ................................................... 346/145
[58] Field of Search ..................... 346/145, 108, 76 L

[56] References Cited

U.S. PATENT DOCUMENTS

| | | | |
|---|---|---|---|
| 3,741,658 | 6/1973 | Hadmi | 346/108 |
| 4,534,313 | 8/1985 | Louvel | 346/76 L |
| 4,603,335 | 7/1986 | Koyasu | 346/145 |

Primary Examiner—E. A. Goldberg
Assistant Examiner—Mark Reinhart

[57] ABSTRACT

A laser materials treatment system in which the (1) laser head and delivery optics, (2) power supply, (3) cooling unit, (4) microprocessor and (5) keyboard and display units are each contained in a separate modular unit. The entire device can therefore be arranged in various ways to conform to particular spatial requirements.

1 Claim, 2 Drawing Figures

LASER MATERIALS TREATMENT SYSTEM

BACKGROUND OF THE INVENTION

1. Field of the Invention

The present invention relates to laser materials treatment systems and, in particular, to laser markers.

2. Background of the Invention

Various laser materials treatment systems including laser marking systems are well known in the art. Generally, such units are made up of five distinct and well known elements, i.e., (1) laser head and delivery optics, (2) power supply, (3) cooling unit, (4) microprocessor and (5) keyboard and display unit. Heretofore, these elements have been utilized into a single unit. Such unitized systems are generally satisfactory for standard applications, but for certain customer unique applications they are less than satisfactory since space limitations, or the like, may require special modifications to the design.

SUMMARY OF THE INVENTION

It is the object of the present invention to provide a material treatment system which has the flexibility to be used without special modifications for customer unique applications. In the laser materials treatment device of the present invention, the laser head and delivery optics, power supply, microprocessor and keyboard and display unit are each contained in separate units. These units are connected together with appropriate electrical and fluid connecting means so that the entire structure can be assembled in numerous positions so as to achieve a variety of standard applications.

BRIEF DESCRIPTION OF THE DRAWINGS

The present invention is further described with reference to the accompanying drawings in which.

DETAILED DESCRIPTION

Figure 1:
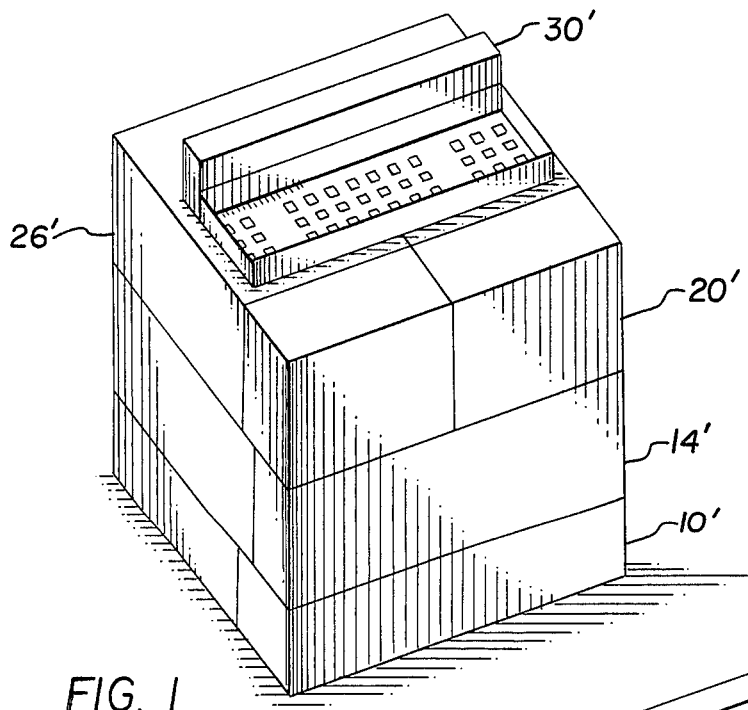
FIG. 1 is a perspective view of a preferred embodiment of a laser marking device of the present invention.
Figure 2:
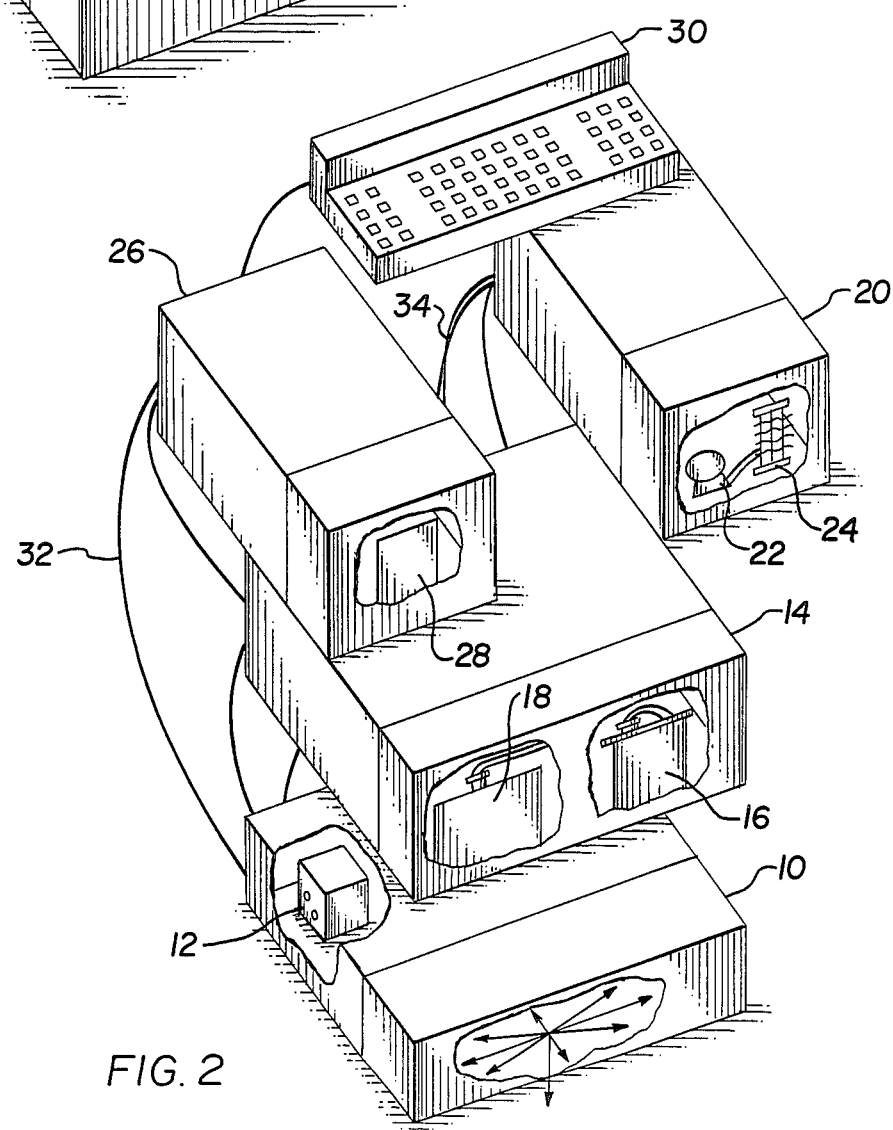
FIG. 2 is an exploded, partially cut away view of the laser marking device shown in FIG. 1 showing the elements in spatially separated arrangement.

Referring to the drawings, the laser marking device of the present invention includes a laser head and delivery optics assembly unit 10 and 10' which includes a laser pumping enclosure 12. This assembly serves to produce incremental beam flashes for producing dots on the material to be marked. As its function and details of its construction are well known in the art, they will not be further described herein. A separate modular power supply unit 14 and 14' having a high voltage power supply 16 and a pulse forming network 18 is also included in this device. A separate modular cooling unit 20 and 20' including a pump 22 and radiator 24 provides recirculating coolant for the laser head and delivery optics assembly unit. The device also includes a separate modular microprocessor 26 and 26' including micro chips as at 28. A separate keyboard and display unit 28 and 28' is also included. Appropriate removable electrical connectors as at 32 connect the various units and fluid conveying tubes as at 34 connect the cooling unit and the laser head and optics unit.

It will be appreciated that the positions of the above described modular units can be interchanged or otherwise arranged so that the entire device can be conformed to particular space limitations or the like.

Although the invention has been described herein with a certain degree of particularity, it is to be understood that the present disclosure has been made only as an example and that the scope of the invention is defined by what is hereinafter claimed.

What is claimed is:

1. A modular laser materials marker assembly comprising:
    a. a plurality of separate, modularized units including a first unit comprising a laser head and delivery optics assembly unit, a second unit comprising a power supply unit, a third unit comprising a cooling unit, a fourth unit comprising a microprocessor unit, and a fifth unit comprising a keyboard and display unit, each of said units being relatively positionable with respect to the others of said units whereby the spatial configuration of said assembly may be arranged in various ways;
    b. removable fluid conveying means for interconnecting the laser head and delivery optics assembly unit; and
    c. removable electrical connecting means for electrically connecting the power supply unit to the laser head and delivery optics assembly unit, the power supply unit to the cooling unit, the power supply unit to the microprocessor unit, the microprocessor unit to the keyboard and display unit, and the microprocessor unit to the laser head and delivery optics assembly unit.

* * * * *